(12) United States Patent
Takeda

(10) Patent No.: US 8,930,545 B2
(45) Date of Patent: *Jan. 6, 2015

(54) TRAVERSAL OF SYMMETRIC NETWORK ADDRESS TRANSLATOR FOR MULTIPLE SIMULTANEOUS CONNECTIONS

(75) Inventor: Yutaka Takeda, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 797 days.

This patent is subject to a terminal disclaimer.

(21) Appl. No.: 13/224,253

(22) Filed: Sep. 1, 2011

(65) Prior Publication Data

US 2011/0317705 A1   Dec. 29, 2011

Related U.S. Application Data

(63) Continuation of application No. 12/043,080, filed on Mar. 5, 2008, now Pat. No. 7,856,506, and a continuation of application No. 12/910,624, filed on Oct. 22, 2010, now Pat. No. 8,015,300.

(51) Int. Cl.
*G06F 15/16*     (2006.01)
*H04L 12/28*     (2006.01)
*H04L 29/12*     (2006.01)

(52) U.S. Cl.
CPC .... *H04L 29/12528* (2013.01); *H04L 29/12537* (2013.01); *H04L 61/2575* (2013.01); *H04L 61/2578* (2013.01); *H04L 29/125* (2013.01); *H04L 61/2564* (2013.01)
USPC ............................. 709/227; 709/228; 370/420

(58) Field of Classification Search
CPC ................... H04L 29/12528; H04L 29/12537; H04L 61/2564; H04L 61/2575; H04L 61/2578
USPC ................... 709/227, 228, 238, 245; 370/420
See application file for complete search history.

(56) References Cited

U.S. PATENT DOCUMENTS

| | | | |
|---|---|---|---|
| 4,764,928 A | 8/1988 | Akerberg |
| 4,787,051 A | 11/1988 | Olson |
| 4,843,568 A | 6/1989 | Krueger |
| 5,128,671 A | 7/1992 | Thomas, Jr. |
| 5,528,265 A | 6/1996 | Harrison |
| 5,544,325 A | 8/1996 | Denny et al. |

(Continued)

FOREIGN PATENT DOCUMENTS

| | | |
|---|---|---|
| CN | 1998218 A | 7/2007 |
| EP | 0 913 965 | 5/1999 |

(Continued)

OTHER PUBLICATIONS

Office Action dated Jun. 4, 2009 issued for U.S. Appl. No. 10/215,899.

(Continued)

*Primary Examiner* — Brian J Gillis
(74) *Attorney, Agent, or Firm* — Joshua D. Isenberg; JDI Patent

(57) ABSTRACT

Handling of multiple connections during NAT traversal for a node behind a symmetric NAT is disclosed. The likelihood of connection failure during symmetric NAT traversal may be reduced by serializing critical time windows after port prediction. Once a connection request has been sent for a first connection, port prediction for a subsequent connection may be delayed until a connectivity check has begun for the first connection. This process may be repeated to handle NAT traversal for multiple simultaneous connections to different nodes.

16 Claims, 4 Drawing Sheets

(56) References Cited

U.S. PATENT DOCUMENTS

| | | |
|---|---|---|
| 5,596,720 A | 1/1997 | Hamada et al. |
| 5,630,184 A | 5/1997 | Roper et al. |
| 5,636,216 A | 6/1997 | Fox et al. |
| 5,701,427 A | 12/1997 | Lathrop |
| 5,768,382 A | 6/1998 | Schneier et al. |
| 5,768,531 A | 6/1998 | Lin |
| 5,793,763 A | 8/1998 | Mayes et al. |
| 5,809,016 A | 9/1998 | Kreitzer et al. |
| 5,812,531 A | 9/1998 | Cheung et al. |
| 5,835,726 A | 11/1998 | Shwed et al. |
| 5,856,972 A | 1/1999 | Riley et al. |
| 5,898,679 A | 4/1999 | Brederveld et al. |
| 5,956,485 A | 9/1999 | Perlman |
| 6,012,096 A | 1/2000 | Link et al. |
| 6,058,431 A | 5/2000 | Srisuresh et al. |
| 6,128,623 A | 10/2000 | Mattis et al. |
| 6,128,624 A | 10/2000 | Papierniak et al. |
| 6,128,627 A | 10/2000 | Mattis et al. |
| 6,128,664 A | 10/2000 | Yanagidate et al. |
| 6,138,156 A | 10/2000 | Fletcher et al. |
| 6,151,584 A | 11/2000 | Papierniak et al. |
| 6,151,601 A | 11/2000 | Papierniak et al. |
| 6,152,824 A | 11/2000 | Rothschild et al. |
| 6,157,368 A | 12/2000 | Faeger |
| 6,208,649 B1 | 3/2001 | Kloth |
| 6,209,003 B1 | 3/2001 | Mattis et al. |
| 6,212,565 B1 | 4/2001 | Gupta |
| 6,212,633 B1 | 4/2001 | Levy et al. |
| 6,289,358 B1 | 9/2001 | Mattis et al. |
| 6,292,880 B1 | 9/2001 | Mattis et al. |
| 6,327,630 B1 | 12/2001 | Carroll et al. |
| 6,333,931 B1 | 12/2001 | LaPier et al. |
| 6,349,210 B1 | 2/2002 | Li |
| 6,353,891 B1 | 3/2002 | Borella et al. |
| 6,375,572 B1 | 4/2002 | Masuyama |
| 6,389,462 B1 | 5/2002 | Cohen et al. |
| 6,393,488 B1 | 5/2002 | Araujo |
| 6,405,104 B1 | 6/2002 | Dougherty |
| 6,421,347 B1 | 7/2002 | Borgstahl et al. |
| 6,487,583 B1 | 11/2002 | Harvey et al. |
| 6,487,600 B1 | 11/2002 | Lynch |
| 6,535,511 B1 | 3/2003 | Rao |
| 6,549,786 B2 | 4/2003 | Cheung et al. |
| 6,553,515 B1 | 4/2003 | Gross et al. |
| 6,581,108 B1 | 6/2003 | Denison et al. |
| 6,590,865 B1 | 7/2003 | Ibaraki et al. |
| 6,616,531 B1 | 9/2003 | Mullins |
| 6,618,757 B1 | 9/2003 | Babbitt et al. |
| 6,636,898 B1 | 10/2003 | Ludovici et al. |
| 6,640,241 B1 | 10/2003 | Ozzie et al. |
| 6,641,481 B1 | 11/2003 | Mai et al. |
| 6,661,799 B1 | 12/2003 | Molitor |
| 6,667,972 B1 | 12/2003 | Foltan et al. |
| 6,668,283 B1 | 12/2003 | Sitaraman et al. |
| 6,701,344 B1 | 3/2004 | Holt et al. |
| 6,704,574 B2 | 3/2004 | Lin |
| 6,712,697 B2 | 3/2004 | Acres |
| 6,772,219 B1 | 8/2004 | Shobatake |
| 6,779,017 B1 | 8/2004 | Lamberton et al. |
| 6,779,035 B1 | 8/2004 | Gbadegesin |
| 6,789,126 B1 | 9/2004 | Saulpaugh et al. |
| 6,799,255 B1 | 9/2004 | Blumenau et al. |
| 6,807,575 B1 | 10/2004 | Emaru et al. |
| 6,816,703 B1 | 11/2004 | Wood et al. |
| 6,829,634 B1 | 12/2004 | Holt et al. |
| 6,848,997 B1 | 2/2005 | Hashimoto et al. |
| 6,891,801 B1 | 5/2005 | Herzog |
| 6,899,628 B2 | 5/2005 | Leen et al. |
| 6,920,501 B2 | 7/2005 | Chu et al. |
| 6,978,294 B1 | 12/2005 | Adams et al. |
| 7,016,942 B1 | 3/2006 | Odom |
| 7,017,138 B2 | 3/2006 | Zirojevic et al. |
| 7,035,911 B2 | 4/2006 | Lowrey et al. |
| 7,043,641 B1 | 5/2006 | Martinek et al. |
| 7,065,579 B2 | 6/2006 | Traversat et al. |
| 7,082,316 B2 | 7/2006 | Eiden et al. |
| 7,096,006 B2 | 8/2006 | Lai et al. |
| 7,107,348 B2 | 9/2006 | Shimada et al. |
| 7,120,429 B2 | 10/2006 | Minear et al. |
| 7,123,608 B1 | 10/2006 | Scott et al. |
| 7,127,613 B2 | 10/2006 | Pabla et al. |
| 7,130,921 B2 | 10/2006 | Goodman et al. |
| 7,133,368 B2 | 11/2006 | Zhang et al. |
| 7,134,961 B2 | 11/2006 | Hora |
| 7,155,515 B1 | 12/2006 | Brown et al. |
| 7,155,518 B2 | 12/2006 | Forslow |
| 7,168,089 B2 | 1/2007 | Nguyen et al. |
| 7,174,382 B2 | 2/2007 | Ramanathan et al. |
| 7,177,950 B2 | 2/2007 | Narayan et al. |
| 7,177,951 B1 | 2/2007 | Dykeman et al. |
| 7,194,654 B2 | 3/2007 | Wray et al. |
| 7,197,565 B2 | 3/2007 | Abdelaziz et al. |
| 7,203,841 B2 | 4/2007 | Jackson et al. |
| 7,216,359 B2 | 5/2007 | Katz et al. |
| 7,240,093 B1 | 7/2007 | Danieli et al. |
| 7,254,709 B1 | 8/2007 | Richard |
| 7,263,070 B1 | 8/2007 | Delker et al. |
| 7,272,636 B2 | 9/2007 | Pabla |
| 7,321,928 B2 | 1/2008 | Feltin et al. |
| 7,340,500 B2 | 3/2008 | Traversat et al. |
| 7,346,015 B2 | 3/2008 | Shipman |
| 7,392,375 B2 | 6/2008 | Bartram et al. |
| 7,398,388 B2 | 7/2008 | Xu et al. |
| 7,407,434 B2 | 8/2008 | Thomas et al. |
| 7,429,215 B2 | 9/2008 | Rozkin et al. |
| 7,451,490 B2 | 11/2008 | Pirich et al. |
| 7,457,279 B1 | 11/2008 | Scott et al. |
| 7,533,172 B2 | 5/2009 | Traversat et al. |
| 7,803,052 B2 | 9/2010 | Multerer et al. |
| 8,015,300 B2 | 9/2011 | Takeda |
| 2001/0005368 A1 | 6/2001 | Rune |
| 2001/0017856 A1 | 8/2001 | Asokan et al. |
| 2001/0021188 A1 | 9/2001 | Fujimori et al. |
| 2001/0044339 A1 | 11/2001 | Cordero et al. |
| 2001/0046213 A1 | 11/2001 | Sakoda |
| 2002/0002074 A1 | 1/2002 | White et al. |
| 2002/0006114 A1 | 1/2002 | Bjelland et al. |
| 2002/0013838 A1 | 1/2002 | Kushida et al. |
| 2002/0016826 A1 | 2/2002 | Johansson et al. |
| 2002/0035604 A1 | 3/2002 | Cohen et al. |
| 2002/0055989 A1 | 5/2002 | Stringer-Calvert et al. |
| 2002/0075844 A1 | 6/2002 | Hagen |
| 2002/0085097 A1 | 7/2002 | Colmenarez et al. |
| 2002/0097732 A1 | 7/2002 | Worster et al. |
| 2002/0107786 A1 | 8/2002 | Lehmann-Haupt et al. |
| 2002/0107935 A1 | 8/2002 | Lowery et al. |
| 2002/0119821 A1 | 8/2002 | Sen et al. |
| 2002/0138471 A1 | 9/2002 | Dutta et al. |
| 2002/0143855 A1 | 10/2002 | Traversat et al. |
| 2002/0147810 A1 | 10/2002 | Traversat et al. |
| 2002/0161821 A1 | 10/2002 | Narayan et al. |
| 2002/0183004 A1 | 12/2002 | Fulton et al. |
| 2002/0184310 A1 | 12/2002 | Traversat et al. |
| 2002/0184311 A1 | 12/2002 | Traversat et al. |
| 2003/0027634 A1 | 2/2003 | Matthews, III |
| 2003/0028585 A1 | 2/2003 | Yeager et al. |
| 2003/0045359 A1 | 3/2003 | Leen et al. |
| 2003/0046292 A1 | 3/2003 | Subramanian et al. |
| 2003/0051052 A1 | 3/2003 | Shteyn et al. |
| 2003/0055892 A1 | 3/2003 | Huitema et al. |
| 2003/0055978 A1 | 3/2003 | Collins |
| 2003/0079003 A1 | 4/2003 | Burr |
| 2003/0084282 A1 | 5/2003 | Taruguchi |
| 2003/0097408 A1 | 5/2003 | Kageyama et al. |
| 2003/0104829 A1 | 6/2003 | Alzoubi et al. |
| 2003/0115258 A1 | 6/2003 | Baumeister et al. |
| 2003/0126229 A1 | 7/2003 | Kantor et al. |
| 2003/0126245 A1 | 7/2003 | Feltin et al. |
| 2003/0135625 A1 | 7/2003 | Fontes et al. |
| 2003/0152034 A1 | 8/2003 | Zhang et al. |
| 2003/0158961 A1 | 8/2003 | Nomura et al. |
| 2003/0162556 A1 | 8/2003 | Libes |
| 2003/0177187 A1 | 9/2003 | Levine et al. |
| 2003/0182421 A1 | 9/2003 | Faybishenko et al. |

(56) References Cited

U.S. PATENT DOCUMENTS

| | | |
|---|---|---|
| 2003/0182428 A1 | 9/2003 | Li et al. |
| 2003/0191828 A1 | 10/2003 | Ramanathan et al. |
| 2003/0217096 A1 | 11/2003 | McKelvie et al. |
| 2003/0217135 A1 | 11/2003 | Chatani et al. |
| 2003/0227939 A1 | 12/2003 | Yukie et al. |
| 2003/0229779 A1 | 12/2003 | Morais et al. |
| 2003/0229789 A1 | 12/2003 | Morais et al. |
| 2003/0233281 A1 | 12/2003 | Takeuchi et al. |
| 2004/0007618 A1 | 1/2004 | Oram et al. |
| 2004/0015548 A1 | 1/2004 | Lee |
| 2004/0018839 A1 | 1/2004 | Andric et al. |
| 2004/0024879 A1 | 2/2004 | Dingman et al. |
| 2004/0063497 A1 | 4/2004 | Gould |
| 2004/0085947 A1 | 5/2004 | Ekberg et al. |
| 2004/0087369 A1 | 5/2004 | Tanaka |
| 2004/0088369 A1 | 5/2004 | Yeager et al. |
| 2004/0103179 A1 | 5/2004 | Damm et al. |
| 2004/0110563 A1 | 6/2004 | Tanaka |
| 2004/0133631 A1 | 7/2004 | Hagen et al. |
| 2004/0139228 A1 | 7/2004 | Takeda et al. |
| 2004/0162871 A1 | 8/2004 | Pabla et al. |
| 2004/0181463 A1 | 9/2004 | Goldthwaite et al. |
| 2004/0207880 A1 | 10/2004 | Thakur |
| 2004/0212589 A1 | 10/2004 | Hall et al. |
| 2004/0236863 A1 | 11/2004 | Shen et al. |
| 2004/0236945 A1 | 11/2004 | Risan et al. |
| 2004/0243665 A1 | 12/2004 | Markki et al. |
| 2004/0249891 A1 | 12/2004 | Khartabil et al. |
| 2004/0254977 A1 | 12/2004 | Zhang |
| 2004/0267876 A1 | 12/2004 | Kakivaya et al. |
| 2005/0007964 A1 | 1/2005 | Falco et al. |
| 2005/0015626 A1 | 1/2005 | Chasin |
| 2005/0020354 A1 | 1/2005 | Nguyen et al. |
| 2005/0026698 A1 | 2/2005 | Pirich et al. |
| 2005/0063409 A1 | 3/2005 | Oommen |
| 2005/0064939 A1 | 3/2005 | McSheffrey et al. |
| 2005/0065632 A1 | 3/2005 | Douglis et al. |
| 2005/0080858 A1 | 4/2005 | Pessach |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0105526 A1 | 5/2005 | Stiemerling et al. |
| 2005/0141522 A1 | 6/2005 | Kadar et al. |
| 2005/0149481 A1 | 7/2005 | Hesselink et al. |
| 2005/0221858 A1 | 10/2005 | Hoddie |
| 2005/0250487 A1 | 11/2005 | Miwa |
| 2005/0251577 A1 | 11/2005 | Guo et al. |
| 2005/0259637 A1 | 11/2005 | Chu et al. |
| 2006/0015582 A1 | 1/2006 | Morita et al. |
| 2006/0063587 A1 | 3/2006 | Manzo |
| 2006/0067290 A1 | 3/2006 | Miwa |
| 2006/0068702 A1 | 3/2006 | Miwa |
| 2006/0075127 A1 | 4/2006 | Juncker et al. |
| 2006/0084504 A1 | 4/2006 | Chan et al. |
| 2006/0111979 A1 | 5/2006 | Chu |
| 2006/0209822 A1 | 9/2006 | Hamamoto |
| 2006/0288103 A1 | 12/2006 | Gobara et al. |
| 2007/0058792 A1 | 3/2007 | Chaudhari et al. |
| 2007/0061460 A1 | 3/2007 | Khan et al. |
| 2007/0076729 A1 | 4/2007 | Takeda |
| 2007/0077981 A1 | 4/2007 | Hungate et al. |
| 2007/0150552 A1 | 6/2007 | Harris et al. |
| 2007/0165629 A1 | 7/2007 | Chaturvedi et al. |
| 2007/0191109 A1 | 8/2007 | Crowder et al. |
| 2007/0198418 A1 | 8/2007 | MacDonald et al. |
| 2007/0208748 A1 | 9/2007 | Li |
| 2007/0213124 A1 | 9/2007 | Walker et al. |
| 2007/0217436 A1 | 9/2007 | Markley et al. |
| 2007/0237153 A1 | 10/2007 | Slaughter et al. |
| 2008/0168181 A1 | 7/2008 | Berkvens et al. |
| 2009/0077245 A1 | 3/2009 | Smelyansky et al. |
| 2009/0111532 A1 | 4/2009 | Salokannel et al. |
| 2009/0138610 A1 | 5/2009 | Gobara et al. |
| 2009/0240821 A1 | 9/2009 | Juncker et al. |
| 2010/0039937 A1 | 2/2010 | Ramanujan et al. |

FOREIGN PATENT DOCUMENTS

| | | |
|---|---|---|
| EP | 1 107 508 | 6/2001 |
| EP | 1 374 959 | 5/2003 |
| JP | 2001 53901 | 2/2001 |
| JP | 2002 10321 | 1/2002 |
| JP | 2004 135778 | 5/2004 |
| JP | 2004 136009 | 5/2004 |
| JP | 2004 141225 | 5/2004 |
| JP | 2005 319047 | 11/2005 |
| JP | 2005 323116 | 11/2005 |
| JP | 2005 323117 | 11/2005 |
| JP | 2005346461 | 12/2005 |
| JP | 2006136031 | 5/2006 |
| WO | WO 99/35799 | 7/1999 |
| WO | WO 01/97485 | 12/2001 |
| WO | WO 02/03217 | 1/2002 |
| WO | WO 02/11366 | 2/2002 |
| WO | WO 02/23822 | 3/2002 |
| WO | WO 03/069495 | 8/2003 |
| WO | WO2004/038541 A2 | 5/2004 |
| WO | WO2004063843 | 7/2004 |
| WO | WO2005088466 | 9/2005 |
| WO | 2007041417 A | 4/2007 |
| WO | WO2007041417 | 4/2007 |

OTHER PUBLICATIONS

Office Action dated Nov. 7, 2008 issued for U.S. Appl. No. 10/215,899.

Office Action dated Mar. 13, 2008 issued for U.S. Appl. No. 10/215,899.

Office Action dated Sep. 11, 2007 issued for U.S. Appl. No. 10/215,899.

Office Action dated Mar. 22, 2007 issued for U.S. Appl. No. 10/215,899.

Office Action dated Aug. 12, 2005 issued for U.S. Appl. No. 10/215,899.

NAT and Network Games, p. 1-5, entitled: Just the FAOs, Ma'am, http://www.u.arizona.edu/~trw/games/nat.htm, Oct. 23, 2002.

BroadbandReports.com, How to hookup our console to the net—section all, pp. 1 to 22, http://www.dslreports.com/faq/onlinegaming/all (2002).

Do I use NAT?, pp. 1 to 3, http://www.u.arizona.edu/~trw/games/nat or not.php, Oct. 23, 2002.

Home Toys Article, HAI Omni Solution, UPnP NAT Traversal FAQ, pp. 1 to 4 http://hometoys.com/htinews/aug01/articles/microsoft/upnp.htm, Nov. 11, 2002.

InternetGatewayDevice: I Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society (2002).

Traversal Using Relay NAT (TURN), Rosenberg, Weinberger, Huitema, Mahy, Nov. 14, 2001, pp. 1 to 17.

http://www2.simplex.com/ip.shtml.

http://www.dslreports.com/ip.

Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

(56) References Cited

OTHER PUBLICATIONS

Office Action issued by the USPTO on Apr. 15, 2010 for U.S. Appl. No. 12/235,438.
Arno Wacker et al—"A NAT Traversal Mechanism for Peer-to Peer Networks"—Eighth International Conference on Peer-to Peer Computing (P2P'08), 2008. IEEE. pp. 81-83.
Jim Dowling et al.—"Improving ICE Service Selection in a P2P System using the Gradient Topology"—First International Conference on Self-Adaptive and Self-Organizing Systems (SASO 07), 2007, IEEE, pp. 285-288.
European Search Report dated Jan. 28, 2010 issued for European patent application No. 99252219.2.
Office Action dated Mar. 24, 2010 issued for U.S. Appl. No. 12/235,409.
J. Rosenberg, Interactive Connectivity Establishment (ICE): A Methodology for Network Address Translator (NAT) Traversal for Multimedia Session Establishment Protocols, Jul. 19, 2004, retrieved from http://tools.ietf.org/id/draft-ietf-mmusic-ice-02.txt.
Non-Final Office Action dated Nov. 25, 2008 for U.S. Appl. No. 11/243,853.
Final Office Action dated May 28, 2009 for U.S. Appl. No. 11/243,853.
Non-Final Office Action dated Oct. 13, 2009 for U.S. Appl. No. 11/243,853.
Final Office Action dated Apr. 12, 2010 for U.S. Appl. No. 11/243,853.
J. Rosenberg, "Simple Traversal of UDP Through Network Address Translators (NAT)", BEHAVE Internet-Draft, Jul. 17, 2005.
J. Rosenberg, "Interactive Connectivity Establishment (ICE): A Methodology for Network Address Translator (NAT) Traversal for Offer/Answer Protocols", MMUSIC Internet-Draft, Jul. 17, 2005.
F. Audet, "NAT Behavioral Requirements for Unicast UDP", BEHAVE Internet Draft, Jul. 15, 2005.
J. Rosenberg, "Interactive Connectivity Establishment (ICE): A Methodology for Network Address Translator (NAT) Traversal for Multimedia Session Establishment Protocols", MMUSIC Internet-Draft, Oct. 25, 2004.
J. Rosenberg, Traversal Using Relay NAT (TURN), MIDCOM Internet-Draft, Oct. 20, 2003.
Y. Takuda, "Symmetric NAT Traversal using STUN", Internet Engineering Task Force, Jun. 2003.
J. Rosenberg, "STUN—Simple Traversal of User Datagram Protocols (UDP) Through Network Address Translators (NATs)", Network Working Group, Mar. 2003.
J. Rosenberg, "Interactive Connectivity Establishment (ICE): A Methodology for Network Address Translator (NAT) Traversal for Offer/Answer Protocols", MMUSIC Internet-Draft, Jan. 16, 2007.
International application No. PCT/US2006/038285, "The International Search Report and the Written Opinion of the International Searching Authority".
PCT International Search Report dated Sep. 28, 2009 for international application No. PCT/US2009/034913.
Final Office Action dated Jul. 19, 2010 issued for U.S. Appl. No. 12/235,409.
Final Office Action dated Jul. 19, 2010 issued for U.S. Appl. No. 11/243,853.
Final Office Action dated Aug. 31, 2010 issued for U.S. Appl. No. 12/235,438.
Office Action dated Feb. 15, 2011 for U.S. Appl. No. 11/243,853, 25 pages.
Notice of Allowance dated Mar. 28, 2011 for U.S. Appl. No. 12/235,409, 5 pages.
Steven Hessing: "Peer to Peer Messaging Protocol (PPMP)" Internet Draft, Apr. 2002, pp. 1-57, XP015001173.
Song Jiang et al: "FloodTrial : an efficient file search technique in unstructured peeito-peer systems" GLOBECOM 2003, vol. 5, Dec. 1, 2003, pp. 2891-2895, XP010678188.
Dutkiewicz E Ed—Institute of Electrical and Electronics Engineers: "Impact of transmit range on throughput performance in mobile ad hoc networks" ICC 2001. 2001 IEEE International Conference on Communicanons. Conference Record. Helsinky, Finland, June II 14,2001, IEEE International Conference on Communications, New York, NY IEEE, US, vol. vol. 1 of 10, Jun. 11, 2001, pp. 2933-2937, XP 010553662 ISBN: 0-7803-7097-1.
Kim Y Ed—Association for Computing Machinery: "Simple and Fault-Tolerant Key Agreement by Dynamic Collaborative Groups", Proceedings of the 7m ACM Conference on Computer and Communications Security. CS 2000. Athens, Greece, Nov. 1-4, 2000, ACM Conference on Computer and Communications Security, New Your, NY: ACM, US, vol. Conf. 7, Nov. 1, 2000, pp. 1 38, XP 002951317 ISBN: 1-58113-203 4.
Baughman et al., Cheat-proof playout for centralized and distributed online games, INFOCOM2001. Twentieth Annual Joint Conference of the IEEE Computer and Communications Societies. Proceedings. IEEE Publication Date: 2226 Apr. 2001, On pp. 104-113, vol. 1.
Bolt, R.A>,"Put-that-there": voice and gesture at the graphics interface, Computer Graphic, vol. 14, No. 3(ACMSIGGRAPH Conference Proceedings) Jul. 1980, pp. 262-270.
DeWitt, Thomas and Edelstein, Phil,"Pantomation: A System for Position Tracking," Proceedings of the $2^{nd}$ Symposium on Small Computer in the Arts, Oct. 1982, pp. 61-69.
Office Action dated Sep. 9, 2010 for U.S. Appl. No. 11/708,988, 8 pages.
Office Action for U.S. Appl. No. 11/243,853 dated Aug. 18, 2011.
Japanese Office Action for Japanese Patent Application No. 2009-217541 dated Aug. 9, 2011 and its English translation.
Chinese Office Action for CN Application No. 200980107737, dated Dec. 28, 2012.
Chinese Office Action for CN Application No. 200980107737, dated Jul. 5, 2013.
Chinese Office Action for CN Application No. 201210502601.3, dated Mar. 3, 2014.
Extended European Search Report for EP Application No. 09716962. 7, dated Feb. 29, 2012.
Saikat Guha, Yutaka Takeda, Paul Francis: "NUTSS: A SIP-based Approach to UDP and TCP Network Connectivity", ACM, 2 Penn Plaza, Suite 701—New York, USA, Aug. 30, 2004-Sep. 3, 2004, pp. 43-48, XP040008009, *Chapter 3*.
Takeda Panasonic Communications Research Laboratory Y: "Symmetric NAT Traversal using STUN <draft-takeda-symmetric-nat-traversal-00.txt>; draft-takeda-symmetric-nat-traversal-00.txt", Internet Engineering Task Force, IETF, CH, Jun. 2003, XP015005445, ISSN: 0000-0004 *Chapter 6*.

TRAVERSAL OF SYMMETRIC NETWORK ADDRESS TRANSLATOR FOR MULTIPLE SIMULTANEOUS CONNECTIONS

CLAIM OF PRIORITY

This Application claims the benefit of priority of commonly-assigned, U.S. patent application Ser. No. 12/043,080, now U.S. Pat. No. 7,856,506, to Yutaka Takeda, filed Mar. 5, 2008 and entitled TRAVERSAL OF SYMMETRIC NETWORK ADDRESS TRANSLATOR FOR MULTIPLE SIMULTANEOUS CONNECTIONS, the entire contents of which are incorporated herein by reference.

This Application claims the benefit of priority of commonly-assigned, co-pending U.S. patent application Ser. No. 12/910,624 to Yutaka Takeda, filed Oct. 22, 2010 and entitled TRAVERSAL OF SYMMETRIC NETWORK ADDRESS TRANSLATOR FOR MULTIPLE SIMULTANEOUS CONNECTIONS, the entire contents of which are incorporated herein by reference.

FIELD OF THE INVENTION

Embodiments of this invention are related to computer networks and more specifically to peer-to-peer communications across symmetric network address translators on computer networks.

BACKGROUND OF THE INVENTION

The use of routers with a NAT (Network Address Translation) feature can interfere in accessing an internal network from an external network. This can be a particular problem for peer-to-peer applications such as voice communication over the Internet (known as VoIP) and/or online gaming, etc. NAT is an Internet standard that enables a local area network (LAN) to use of one set of private IP addresses for internal traffic and a second set of global IP addresses for external traffic. A node that has NAT capability is often referred as "NAT box".

A NAT (literally) translates network (IP) address between the two networks. Network Address Port Translation (NAPT) translates not only IP address but also port numbers of a transport layer protocol. Although NAT/NAPT has its good properties, there is a significant side effect. If the translation is performed dynamically, nodes in the external network have no way to know the IP address (and the port number) on the NAT ahead of time to reach a node in the internal network. Unfortunately, this is the most common behavior of NAT in the residential and SOHO routers deployed in the current market.

A NAT can generally be categorized as being Full Cone, Restricted Cone, Port Restricted Cone or Symmetric. A full cone NAT maps all requests from the same internal IP address and port to the same external IP address and port. Furthermore, any external host can send a packet to the internal host through a full cone NAT by sending a packet to the mapped external address. In a restricted cone NAT all requests from the same internal IP address and port are mapped to the same external IP address and port. Unlike a full cone NAT, an external host with IP address X can send a packet to the internal host only if the internal host had previously sent a packet to IP address X. A port restricted cone NAT is like a restricted cone NAT, but the restriction also includes port numbers. Specifically, an external host can send a packet, with source IP address X and source port P, to the internal host only if the internal host had previously sent a packet to IP address X and port P.

In a symmetric NAT all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a UDP packet back to the internal host. The symmetric NAT tends to be the most problematic type of NAT to traverse. One technique for symmetric NAT traversal is known as "port prediction", which is described in detail in US Patent Application publication 20070076729A1, which is incorporated herein by reference. In this type of symmetric NAT traversal, a first node is behind a first NAT that is symmetric and a second node that is behind a second NAT. The first node constructs a list of predicted transport addresses on the first NAT and sends a message containing the list of predicted transport addresses to the second node. A connectivity check is performed with the second node using the predicted transport addresses.

It has been estimated that 18% of NATs are Symmetric and a connection failure rate of more than 10% is anticipated without port prediction. Some applications involving NAT traversal may require up to 64 simultaneous connections. It is not clear whether port prediction can reliably work for such applications.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

II. SUMMARY

Port prediction technique is used to traverse symmetric NAT (Network Address Translator). If a node behind a symmetric NAT is trying to connect many remote nodes at a time, prediction could fail with a higher probability. Embodiments of the invention avoid the connection failure caused by the case of simultaneous port prediction by putting new requests on hold until a previous request has reached a connectivity check stage. This allows a node multiple simultaneous connections through a symmetric NAT without causing problems with port prediction.

III. TERMINOLOGY

As used herein, the following terms have the meanings shown in Table I below.

TABLE I

| | |
|---|---|
| natted node | A node behind a NAT. |
| client-server | A network architecture model where all clients connect to a central server. (ex. Web (HTTP) service, etc.) |
| peer-to-peer | A network architecture that does not depend on a central server. Each client (peer) directly connects to other peers. (ex. DHT, VoIP, file sharing system, etc.) |
| transport address | A set of IP address and port number. |
| Voice over IP (VoIP) | A technology enabling routing of conversations over the Internet or any other IP network. |

Acronyms

As used herein, the following acronyms have the meanings shown in Table II below.

TABLE II

| | |
|---|---|
| DHT | Distributed Hash Table (ex. Chord) |
| HTTP | Hyper Text Transfer Protocol |
| IETF | Internet Engineering Task Force |
| LAN | Local Area Network |
| NAT | Network Address Translator (RFC 3022) |
| NAPT | Network Address Port Translation (RFC 3022) |
| SIP | Session Initiation Protocol (RFC 3261) |
| SSP | Session Setup Protocol |
| SOHO | Small Office and Home Office |
| STUN | Session Traversal Utility for NAT (previously known as "Simple Traversal of UDP through NAT") |
| TURN | Traversal Using Relay NAT |
| VoIP | Voice over IP |

IV. PROBLEM ANALYSIS

Figure 1A:
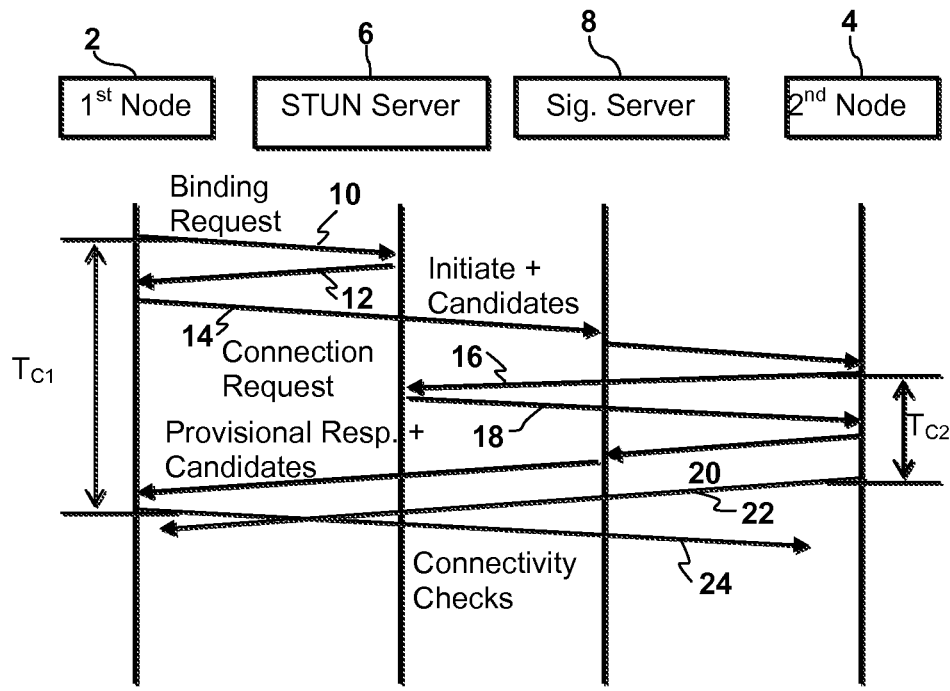
FIGS. 1A-1B are message sequence diagrams illustrating NAT traversal using port prediction.
Figure 1B:
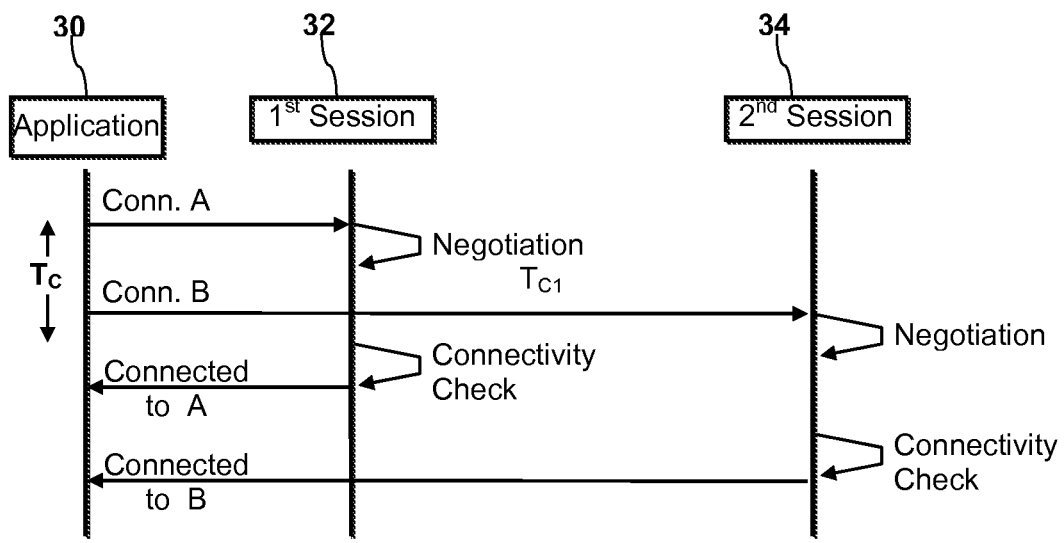

The basic problem of port prediction failure may be understood with respect to FIG. 1A and FIG. 1B. FIG. 1A illustrates the basic flow of NAT traversal when a first node 2 is behind a symmetric NAT (not shown). To initiate communication with a second node 4, the first node 2 sends a binding request 10 to a STUN server 6. In response, the STUN server 6 sends back address information 12 from the symmetric NAT. Using the address information 12 and port prediction, the first node 2 can construct a list of candidate addresses including port numbers. The first node A can send a connection request 14 with the list to node B via a signaling server 8. The second node 4 may also send a binding request 16 to the STUN server 6 and receive address information 18 in response. Using the address information 18, the second node 4 may generate its own list of candidates and send the list in a provisional response 20 to the first node 2. The first and second nodes may then perform connectivity checks by sending check packets 22, 24.

It is noted that a critical time window $T_{C1}$ exists for the first node 2 between the sending of the binding request 10 and the sending of the first of the check packets 22. During this time port prediction performed by the first node 2 is based on the address information 12 sent by the STUN server 6 in response to the binding request 10. If that address information should change during this critical time, the port prediction may fail. The address information may change if the first node 2 initiates another binding request for communication with a third node (not shown). A similar critical time window $T_{C2}$ exists for the second node 4 between receipt of the connection request 14 from the first node 2 and the sending of the first check packets 24.

In general, the critical time window for NAT traversal ends when the first set of connectivity check packets are transmitted. Referring to FIG. 1A, the critical time window $T_{C1}$ for the first node 2 ends when a first set of the check packets 22 are transmitted. The critical time window $T_{C2}$ for the second node 4 ends when a first set of the check packets 24 are transmitted.

The Symmetric NAT traversal described with respect to FIG. 1A works generally quite well for communication between one node and another. An unanticipated problem may arise if a node attempts to make multiple simultaneous connections to different nodes. Such situations may arise, e.g., in multi-player online gaming FIG. 1B illustrates the problem with multiple communication sessions of a single application 30 running on a node behind a Symmetric NAT. By way of example, the application 30 may initiate a first session 32 in which the application attempts a connection to Node A. The first session 32 negotiates the connection starting with a binding request and following receipt of a provisional response begins connectivity checks. Suppose, however that during the critical time window $T_C$ the application 30 initiates a second session 34 in which the application attempts to communicate with Node B. As part of the negotiation for the second session 34, a new NAT binding request will be sent to the STUN server. This changes port assignment on the NAT. Unfortunately, the first session 32 relies on a previous port assignment for port prediction for its communication with Node A. As a result, port prediction for the first session 32 may fail and the first session will time out after some predetermined timeout period has elapsed. Although prior port prediction schemes were subject to noticeable port prediction failures, the particular nature of the problem, as described above, was not generally recognized.

IV. SOLUTION

Embodiments of the present invention overcome problems with multiple port predictions by serializing "critical windows" during the negotiation phase of NAT traversal, while establishing many connections at a time. It is noted that certain applications, such as multi-player online game applications can support the establishment of multiple peer-to-peer connections.

According to an embodiment of the present invention, serialization of the critical time window may be implemented on a node behind a symmetric NAT that attempts to initiate peer-to-peer connections over a network with two or more other nodes. In particular, the first node may perform a port prediction for initiating a communication session with a second node with first node and construct a list of predicted transport addresses on the symmetric NAT and then send a CONNECTION REQUEST message containing the list of predicted transport addresses to the second node. Upon receipt of a provisional response to the CONNECTION REQUEST message. The first node may then perform a check of connectivity between the first node and the second node using the predicted transport addresses, e.g., by sending test packets. The first node may serialize the critical time window by delaying port prediction for communication between the first node and a third node until after the connectivity check has begun.

In a similar fashion, serialization of the critical time window may be implemented on a node behind a symmetric NAT that receives a CONNECTION REQUEST to initiate a peer-to-peer connection over a network while negotiating NAT traversal with one or more other nodes. When such a node receives a CONNECTION REQUEST message from another node it may perform port prediction and send a provisional response to the CONNECTION REQUEST message with a list of predicted addresses and perform a check of connectivity. Port prediction for communication with an additional node may be delayed until after the connectivity check has begun.

Figure 2:
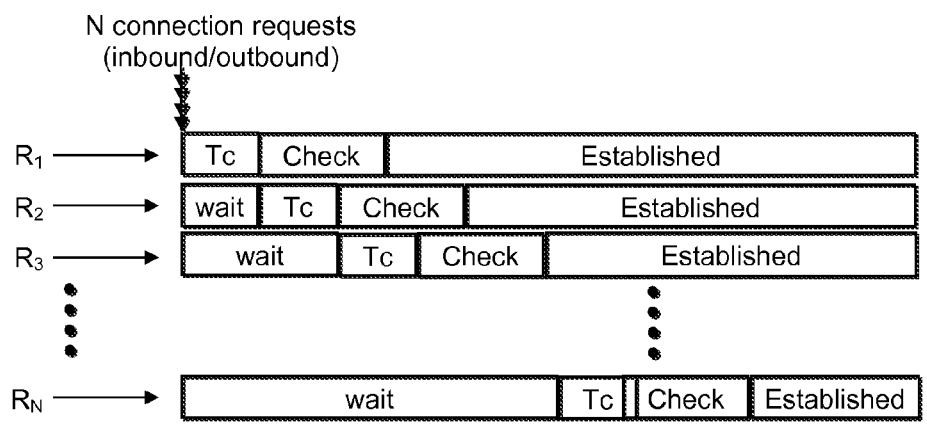
FIG. 2 is a timing diagram illustrating modified port prediction according to an embodiment of the present invention.

Specifically, as shown in the timing diagram of FIG. 2, the first node 2 may originate or receive N connection requests $R_1, R_2, \ldots R_N$ at the same time. The first request $R_1$ may be processed as described above with respect to FIG. 1A. Subsequent requests $R_2 \ldots R_N$, however are queued in a serial fashion in the order in which they were generated or received. Specifically, each of the subsequent requests waits until the critical time window $T_C$ for each previous request has passed before beginning port prediction.

As discussed above, a connection may fail if it cannot be established within a timeout period $T_O$. Consequently, it is desirable that the timeout period $T_O$ is sufficiently long that all N connections can be established. By way of example, assuming that all of the critical time windows $T_C$ for each connection are of some be less than some maximum number of connections the timeout period $T_O$ should be less than $N_{max}T_C+T_{conn}$, where $T_{conn}$ is the time for the connectivity check and $N_{max}$ is some maximum number of possible simultaneous connections.

Figure 3:
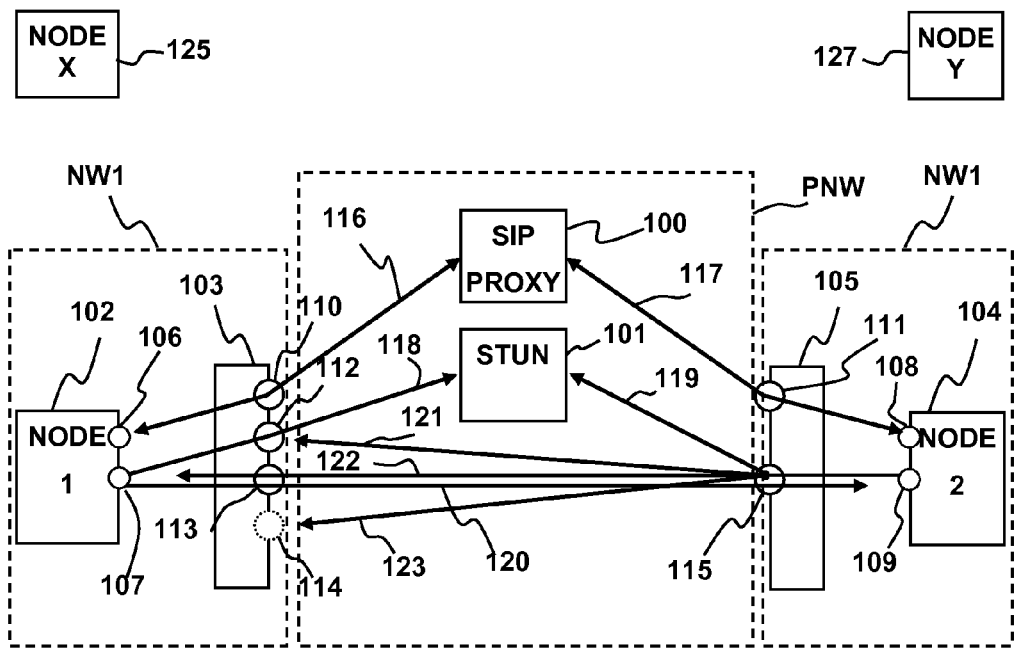
FIG. 3 is a schematic diagram illustrating a system NAT traversal between two nodes according to an embodiment of the present invention.

As shown in FIG. 3, a first node 102 resides in a first private network NW1 that is physically connected to a public network PNW (e.g., the internet) via a first NAT 103. Similarly, second node 104 resides in a second private network NW2 and is able to access the same public network via a second NAT 105. The private networks NW1 and NW2 may each include other nodes and other NATs in addition to the first and second nodes 102, 104 and the first and second NATs 103, 105. Other private networks may also be connected to the public network PNW. The pubic network PNW includes an SIP proxy server 100, and a STUN server 101. The first node 102 has a private IP address that is valid only in the first private network NW1 behind the first NAT 103. The first node 102 has a globally unique and routable IP address, and the first NAT 103 performs IP address and port translation between the public network and the private network. Similarly, the second node 104 has a private IP address that is valid only in the second private network NW2 behind the second NAT 105. The second node 104 has a globally unique and routable IP address, and the second NAT 105 performs IP address and port translation between pubic network and the private network.

The nodes 102, 104 can be, e.g., server hosts such as audio/video (A/V) chat, multimedia streaming devices, file sharing nodes, online gaming modules etc. Each node 102, 104 may be a general purpose computer that becomes a special purpose computer when running instructions, such as instructions for implementing the steps of the method of FIG. 6. By way of example, the nodes 102 and 104 may be SIP user agents and able to send and receive messages each other through a SIP proxy server 100. The nodes 102 and 104 are also STUN clients. Thus, the first node 102 is able to discover the presence and types of NAT in the path between the first node 102 and the STUN server 101 by a communication with the STUN server 101 using STUN protocol. The second node 104 is similarly able to discover the presence and types of NAT between the second node 104 and the STUN server 101.

Figure 4:
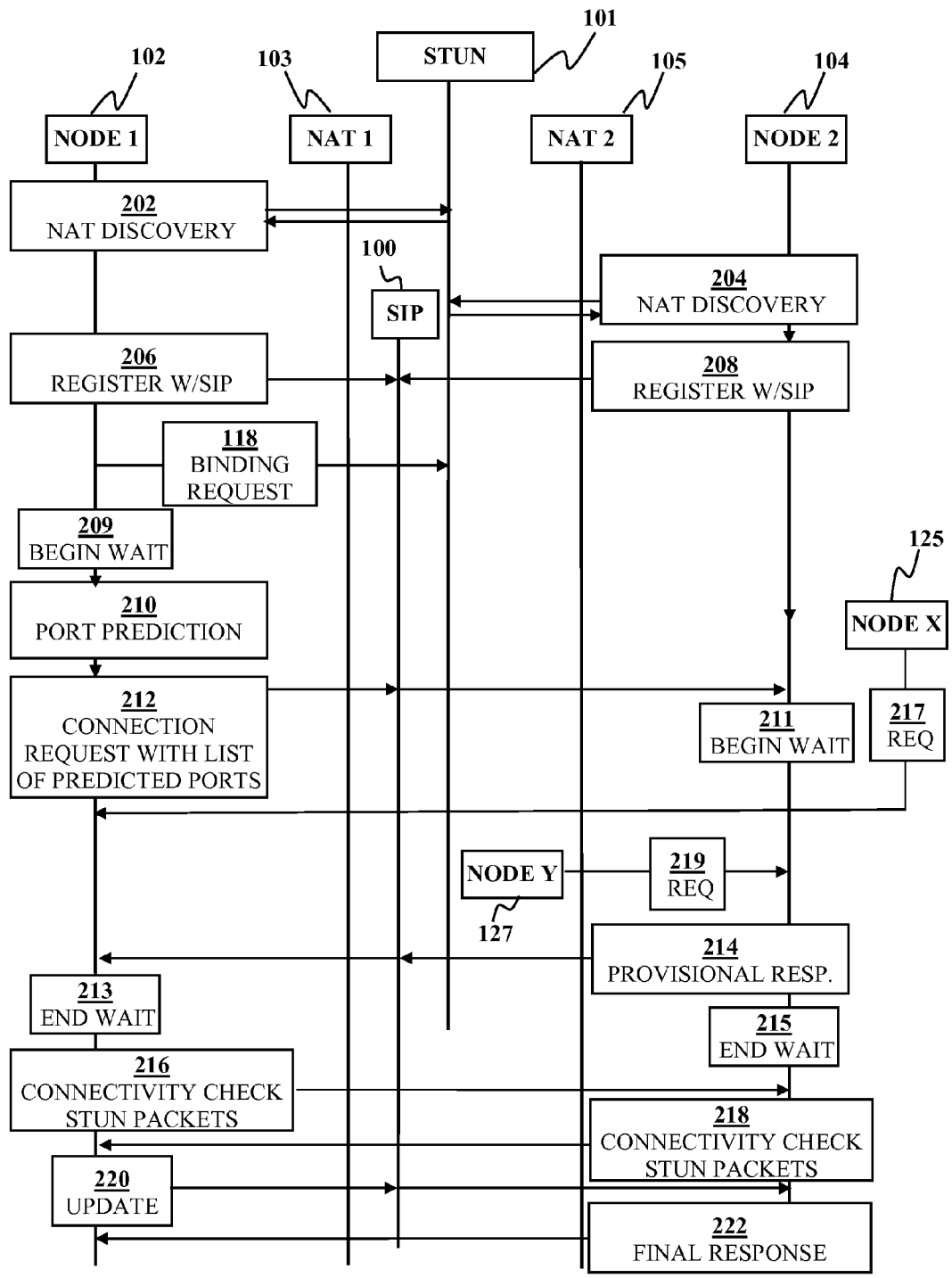
FIG. 4 is a flow diagram illustrating a method of NAT traversal between two nodes according to an embodiment of the present invention.

A method of NAT traversal according to embodiments of the present invention may be understood by simultaneously referring to the block diagram of FIG. 3 and flow diagram of FIG. 4. Initially, each node 102, 104 may perform NAT discovery using STUN protocol as indicated at 202, 204 of FIG. 4. In the example illustrated, the first node 102 discovers that it is behind the first NAT 103 and its type is Symmetric. The second node 104 discovers that it is also behind the second NAT 105 and its type is, e.g., Port restricted-cone. Then, both nodes 102, 104 may register themselves to the SIP proxy server 100 to join a network as indicated at 206, 208. This establishes first and second signaling paths 116, 117 to the SIP proxy server 100. Once established, the SIP proxy server 100 can forward messages to the first and second nodes 102, 104 respectively through the first and second signaling paths 116, 117.

By way of example, the first node 102 may wish to establish a peer-to-peer connection to the second node 104. The first node 102 allocates a local port 107 for the new peer-to-peer session. Then the first node 102 obtains an external port 112 by sending a binding request 118 from the local port 107 to the STUN server 101. The sending of the binding request begins the critical time window for the first node 102. Since the first node 102 knows that the first NAT 103 is present and is of type Symmetric, it may perform port prediction as indicated at 210 and construct a list of transport addresses 107, 110, 112, 113 and 114. The list may be put into a new CONNECTION REQUEST message. In a preferred embodiment, the first node 102 may send no information about the first NAT 103. Furthermore, the first node 102, not the second node 104, may perform the port prediction. In addition, sending CONNECTION REQUEST messages containing transport addresses is perfectly compatible with the existing ICE methodology.

To prevent a subsequent binding request for connection to another node from interfering with port prediction, the first node 102 may begin a wait period upon sending the binding request 118 as indicated at 209. During the wait period, new binding requests for communication with other nodes may be temporarily put on hold and queued in the order in which they originated.

At step 212, the first node 102 sends the CONNECTION REQUEST message with the list of transport addresses to a SIP proxy server 100 through the already established path 116. The SIP proxy server 100 finds in the message that the final destination is the second node 104 and forwards the CONNECTION REQUEST message through the already establish path 117, and port 111 and finally the message reaches the second node 104 on local port 108. On reception of the CONNECTION REQUEST, the second node 104 may allocate a local port 109 for the future peer-to-peer session, and then the second node 104 may obtain an external port 115 by sending a binding request 119 from the local port 109 to the STUN server 101. To prevent a subsequent binding request for connection to another node from interfering with port prediction, the second node 104 may begin a wait period upon receiving the CONNECTION REQUEST message as indicated at 211. During the wait period, the second node 104 may temporarily put new binding requests for communication with other nodes on hold and queue them in the order in which they originated. Specifically, Node 1 102 may put a request 217 from Node X 125 in a queue in the order in which the request was received. Node 2 104 may similarly queue a request 219 from node Y 127.

Since the second node 104 knows that the second NAT 105 is not Symmetric, it puts the local port 109 and the external port 115 in a new provisional response message and sends it back to the first node 102 at 214 via the SIP proxy server 100 and the first and second signaling paths 117, 116. The transmission of the provisional response terminates the transport exchange phase and starts connectivity check phase. At this stage, the first and second nodes 102, 104 may safely initiate new binding requests for communication with other nodes. Consequently, the wait period for the first and second nodes 102, 104 may end, as indicated at 213, 215 respectively To check connectivity, both nodes 102 and 104 may start sending STUN packets from their local ports 107, 109 to check connectivity to the transport addresses obtained from the other node at steps 216, 218. When the first node 102 sends a STUN packet 120, the first NAT 103 allocates a new external port 113, and then the packet 120 reaches the external port 115 on the second NAT 105. The first few packets could be discarded at the external port 115 because the second NAT 105 is a port restricted cone NAT and the second node 104 might not yet have sent a packet from the local port 109 to the external port 113 on the first NAT 103. The second node 104 also sends STUN packets 121, 122, 123 to the obtained transport addresses 112, 113 and 114. The packet 121 reached at the port 112 is discarded because the first NAT 103 is a Symmetric NAT and the port 112 is exclusively allocated for the session to the STUN server 101. The STUN packet 123 reached at 114 is also discarded because there is no such external port allocated by the first NAT 103. The STUN packet 122 reached at 113 is forwarded by the first NAT 103 to the local port 107. The first node 102 then sends a response to the second node 104 and the second node 104 finds it has connectivity to the port 113 on the reception of the response. The STUN packet sent from the local port 107 on the first node 102 to the external port 115 on the second NAT 105 is eventually received at the local port 109 of second node 104. The second node 104 then sends a response back to the first node 102.

Upon reception of the response message, at step 220 the first node 102 sends an UPDATE message to the second node 104 via the SIP proxy server 100 to tell the second node 104 that the first node 102 found connectivity to the external port 115. This triggers the second node 104 to send a final response message to the first node 102 at step 222 to finalize the connection establishment process.

Instead of putting a NAT type in the message and having the second node 104 to make a prediction, the first node 102 makes a prediction and puts the predicted external ports 113, 114 along with the external port 112 obtained from STUN server 101, in the new CONNECTION REQUEST message. Thus, the first node 102 provides no information about the first NAT 103 to the second node 104. Such use of ICE method completely eliminates complicated NAT combination logic for "break-out" packets as done in the prior art (US 2004/0139228). Instead, embodiments of the present invention can achieve the same result by performing a connectivity check that is essentially equivalent to the "break-out packet". Thus, embodiments of the invention allow a system that already uses ICE methodology to add Symmetric NAT traversal capability by simply adding the predicted transport addresses to the connectivity check list.

As described above, the first node 102, i.e., the node attempting to initiate communication with the second node 104 performs a port prediction and puts the predicted ports in the CONNECTION REQUEST message. There are a number of techniques of performing the port prediction. For example, port prediction may be implemented using a port allocation rule discovery process using the following test. The first node 102 sends a STUN binding request to the STUN server 101 without any flags set in the CHANGE-REQUEST attribute and without the RESPONSE-ADDRESS attribute. This causes the STUN server 101 to send responses back to the address and port that the request came from. This test is applied to different combinations of IP addresses and ports in order to figure out the port allocation characteristics of the NAT 103. The STUN server 101 uses two different IP addresses, $C_A$ and $D_A$ and two different ports $C_P$ and $D_P$ as shown in Table III below.

TABLE III

| | DESTINATION | |
|---|---|---|
| | IP ADDRESS | PORT |
| TRY-1 | $D_A$ | $D_P$ |
| TRY-2 | $D_A$ | $C_P$ |
| TRY-3 | $C_A$ | $D_P$ |
| TRY-4 | $C_A$ | $C_P$ |

As can be seen from Table III, the test is performed four times (e.g., from TRY-1 to TRY-4) per local port in this example. All the tests must be done from the same local port. The first node 102 obtains four mapped addresses from the responses. These four mapped addresses are analyzed to determine the port allocation rule and a port increment value $\Delta P$ and to evaluation consistency. To look for consistency, the process can be performed multiple times, preferably using a different local port that does not have a NAT binding associated with it. The port allocation rule can be determined by looking at the port numbers obtained from the mapped addresses. If all port numbers are incremented for successive destinations having different port numbers, the port allocation rule is said to be "port sensitive". If the port increment size from successive destinations having the same IP address (e.g., from TRY-1 to TRY-2 and from TRY-3 to TRY-4) is always zero, but the incremental size from successive destinations having different IP addresses (e.g., TRY-2 to TRY-3) is not zero, the port allocation rule is said to be "address sensitive". If all port numbers of the obtained mapped addresses are the same, the NAT 103 is a 'Cone NAT'.

The $\Delta P$ value may be determined as follows. For address sensitive allocation, the $\Delta P$ value is equal to a port increment size between successive tries for which the destination port is different, e.g., for TRY-2 and TRY-3. The process may be repeated from another local port as shown in Table IV. In this example, TRY-1 through TRY-4 are as in TABLE III and TRY-5-TRY 8 continue the pattern destination IP addresses and port numbers of Table III.

TABLE IV

| TRY | MAPPED ADDRESS | $\Delta P$ |
|---|---|---|
| 1 | 67.105.12.10:49152 | |
| 2 | 67.105.12.10:49152 | 0 |
| 3 | 67.105.12.10:49154 | 2 |
| 4 | 67.105.12.10:49154 | 0 |
| 5 | 67.105.12.10:49156 | 2 |
| 6 | 67.105.12.10:49156 | 0 |
| 7 | 67.105.12.10:49158 | 2 |
| 8 | 67.105.12.10:49158 | 0 |

Note that from Table IV it can be seen that where the destination IP address is the same for successive tries, the port numbers in the corresponding mapped addresses are the same. From this it can be determined that the port allocation rule is "address sensitive". Furthermore it can be seen that the value of ΔP is equal to the port increment between TRY-2 and TRY-3 and is also equal to the port increment sizes between TRY-4 and TRY-5 and between TRY-6 and TRY-7.

For port sensitive allocation, the value of ΔP is the difference between adjoining port numbers of mapped addresses obtained from testing TRY-[N+1] and TRY-[N]. In situations where the first node 102 cannot find consistency in the port increment size for ΔP determination, the application may include an algorithm to determine the ΔP value based on statistical observation, or to decide to give up obtaining a valid ΔP.

If the second NAT 105 is not symmetric, it may be sufficient to perform port prediction, e.g., as part of the NAT discovery step 202 for the just the first node 102. In the case where the second NAT 105 is also a Symmetric NAT, the second node 104 may perform similar port prediction as part of its NAT discovery phase 204.

It is noted that in embodiments of the invention, a node may be configured to serialize the critical time windows for NAT traversal may be serialized for multiple connections to other nodes. Serializing the critical time windows as described above may potentially give rise to a possible pitfall referred to herein as a Symmetric Node Connection Loop. It is noted that queuing connection requests to serialize the critical time windows is not generally necessary for a node that is not behind a symmetric NAT. However, a lockup may occur if critical time window serialization is implemented for three or more nodes, each of which is behind a symmetric NAT. The nature of this pitfall may be appreciated with reference to FIG. 5 in which three nodes A, B and C are all behind symmetric NATs. If Node A tries to contact node B while Node B is trying to contact Node A an initiation dependency loop may be created among the three nodes that could result in a lockup in which none of the nodes can successfully initiate peer-to-peer communication.

Figure 5:
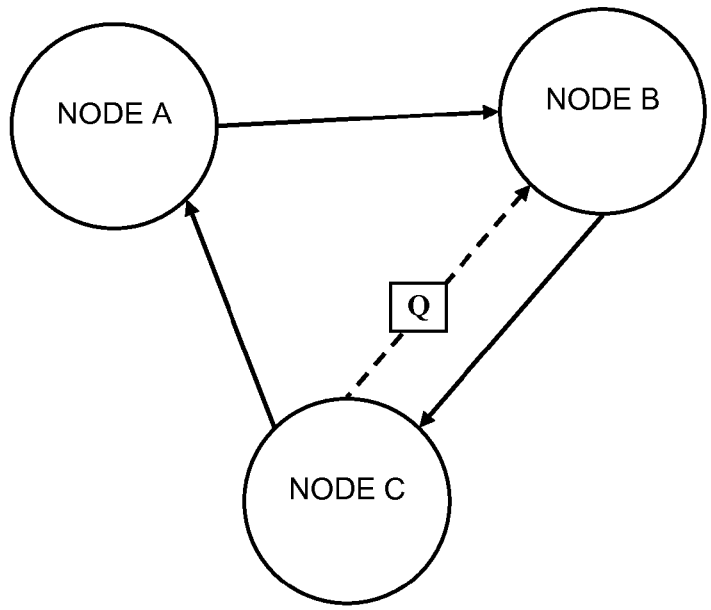
FIG. 5 is a schematic diagram of three nodes communicating over a network illustrating the problem of simultaneous prediction.

In the example depicted in FIG. 5, if all three nodes are configured to implement serialized critical time windows, e.g., as discussed above with respect to FIG. 2, Node A may wait for Node B to initiate with Node C while Node B waits for Node C to initiate with A and Node C waits for Node A to initiate with Node B. In such a situation, all three Nodes may be waiting at the same time, which creates the lockup situation. To overcome this problem, an initiate-transaction timeout may be implemented.

By way of example, Node C could send a "QUEUED" message Q to Node B. The QUEUED message Q indicates that Node C is behind Symmetric NAT and is waiting for a connection to another node. Node B could wait for a predetermined wait time $T_w$, then cancel its initiation with Node C and then subsequently initiate again with C after processing the connection request from Node A. The wait time $T_w$ may be greater than or equal to zero and less than a timeout time that Node B would ordinarily wait before giving up on communication with Node C. A little more specifically, C sends the "QUEUED" message Q to B because C knows that C is behind a symmetric NAT and the request was not processed right away but was queued. Node B could wait a relatively shorter time period (e.g. 3 seconds) in response to the "QUEUED" message, then cancel (put off) the connection process to Node C, process other requests in the queue, then eventually initiate again with C. To prevent Node B from retrying to initiate with Node C indefinitely, the number of retries to the same node may be limited, e.g., up to 3 times, after which, Node B could completely give up. The application running on Node B would receive a connect error in such a case.

As an alternative solution to the lockup, the technique described above may be modified in the following way. The critical time windows may be serialized for outgoing connection requests only and slightly deeper port predictions may be performed. For example, instead of generating a port prediction based on the port increment ΔP, additional port predictions may be generated based on 2ΔP, 3ΔP ... MΔP, where M is an integer referred to herein as the "depth" of the prediction. By way of example, suppose it is determined that for a particular symmetric NAT the port increment ΔP=1. A candidate list based on a port prediction of depth M=1 based on this value of ΔP may look like this:

Candidate 1: type=stun, 202.10.9.20:9021 (predicted)
    Candidate 2: type=local, 192.168.1.2:3658

Deepening the prediction from M=1 to M=3 may produce the following candidate list:

Candidate 1: type=stun, 202.10.9.20:9021 (predicted)
    Candidate 2: type=stun, 202.10.9.20:9022 (predicted)
    Candidate 3: type=stun, 202.10.9.20:9023 (predicted)
    Candidate 2: type=local, 192.168.1.2:3658

Unlike the use of the "QUEUED" signaling message, the foregoing solution may not address every possible lockup situation, but it may be simpler to implement. Furthermore, since connection processes more likely occur in parallel at calling side, serializing the outgoing connections, but not the incoming connections can avoid the most likely lockup situations. Since the critical time windows for incoming connections are not serialized, port prediction may fail. Increasing the depth of the port prediction, e.g., from M=+1 to M=+3 increases the number of predicted candidates, which decreases the likelihood of port prediction failure.

The examples illustrated below with FIG. 3 and FIG. 4 pertains to a peer-to-peer UDP session establishment using SIP (Session Initiation Protocol; RFC 3261) protocol. Embodiments of the invention, however, are applicable to any other signaling protocols that allow a peer to send and receive signals to another peer via a proxy server on the pubic network prior to a peer-to-peer direct connection establishment. Such signaling protocols may include but are not limited to H.323, MGCP, HTTP, XMPP, etc.

Figure 6:
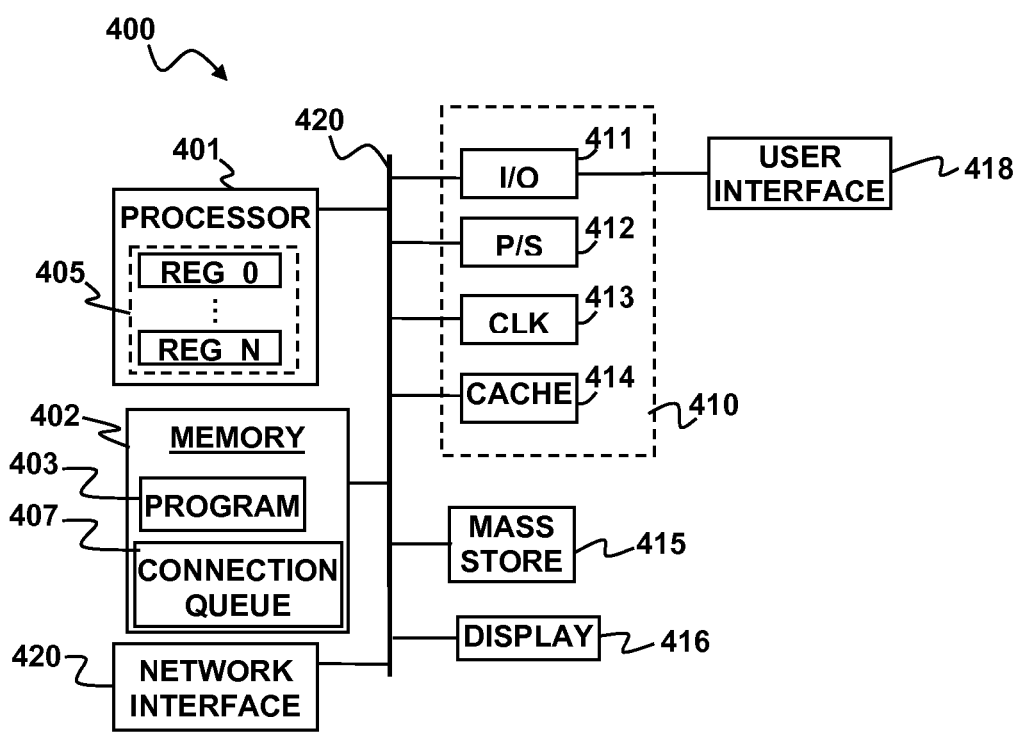
FIG. 6 is a schematic diagram of a node configured to implement port prediction according to an embodiment of the present invention.

The NAT traversal algorithm may be implemented in software or hardware or a combination of both. By way of example, FIG. 6 depicts a computer apparatus 400 for implementing such an algorithm. The apparatus 400 may include a processor module 401 and a memory 402. The processor module 401 may include a single processor or multiple processors. As an example of a single processor, the processor module 401 may include a Pentium® microprocessor from Intel or similar Intel-compatible microprocessor. As an example of a multiple processor module, the processor module 401 may include a cell processor.

The memory 402 may be in the form of an integrated circuit, e.g., RAM, DRAM, ROM, and the like). The memory 402 may also be a main memory or a local store of a synergistic processor element of a cell processor. A computer program 403 that includes the frame reconstruction algorithm described above may be stored in the memory 402 in the form of processor readable instructions that can be executed on the processor module 401. The processor module 401 may include one or more registers 405 into which instructions from the program 403. The instructions of the program 403 may include the steps of the method for peer to peer connection over a network, e.g., as described above with respect to FIG. 2, FIG. 3 and FIG. 4. Specifically, the program 403 may queue requests for connection to other nodes as described above to prevent multiple connection attempts from interfering with port prediction. The program may generate a connection queue 407 that is stored in memory 402. The connection queue 407 may be implemented as a table or other data structure. The connection queue 407 may store the time that a particular connection was initiated so that connections may be released from the queue 407 after the critical time window for another previously initiated queue has passed.

The program 403 may be written in any suitable processor readable language, e.g., C, C++, JAVA, Assembly, MATLAB, FORTRAN and a number of other languages. The apparatus may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The apparatus 400 may also optionally include a display unit 416 and user interface unit to facilitate interaction between the device and a user. The display unit 416 may be in the form of a cathode ray tube (CRT) or flat panel screen that displays text, numerals, graphical symbols or images. The display unit 416 may also include a speaker or other audio transducer that produces audible sounds. The user interface 418 may include a keyboard, mouse, joystick, light pen, microphone, or other device that may be used in conjunction with a graphical user interface (GUI). The apparatus 400 may also include a network interface 420 to enable the device to communicate with other devices over a network, such as the internet. These components may be implemented in hardware, software or firmware or some combination of two or more of these.

V. RESULTS

An embodiment of the invention was tested with a peer-to-peer library that implements NAT traversal features, using a simple connectivity check tool running on top of the peer-to-peer library. Nodes at both ends of the connection were behind Symmetric NATs. A peer-to-peer library node implemented on a PlayStation 3 development station attempted to connect to 64 other nodes running on a Linux PC. Critical time windows for both outbound and inbound connections were serialized. All 64 connections successfully established.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for peer-to-peer connection over a network between a first node behind a first symmetric network address translator (NAT) and two or more other nodes, the method comprising:
    a) receiving at the first node a provisional response to a connection request message sent to a second node, wherein the connection request message contains a list of predicted transport addresses;
    b) performing a check of connectivity between the first node and the second node using the predicted transport addresses; and
    c) delaying port prediction for communication between the first node and a third node until after the check of connectivity between the first node and the second node has begun.

2. The method of claim 1, further comprising:
    d) after c), performing the port prediction for communication between the first node and a third node, wherein the first node constructs a list of predicted transport addresses on the first symmetric NAT;
    e) sending a connection request message containing the list of predicted transport addresses from the first node to a third node;
    f) performing a check of connectivity between the first node and the third node using the predicted transport addresses.

3. The method of claim 2, further comprising: g) delaying port prediction for communication between the first node and a fourth node until after the check of connectivity between the first node and the third node.

4. The method of claim 1 wherein performing the check of connectivity includes sending Session Traversal Utility for NAT (STUN) packets from the second node to one or more transport addresses in the list of predicted transport addresses in the connection request message.

5. The method of claim 4 wherein performing the check of connectivity further includes sending a STUN packet response from the first node to the second node, wherein the STUN packet response includes a transport address of an external port on the first symmetric NAT through which one of the STUN packets sent from the second node reached the first node.

6. The method of claim 1, further comprising:
    waiting for a period of time $T_w$ before a) in response to a message from the second node indicating that the second node is queued for connection to another node;
    canceling the communication session between the first node and the second node; and
    repeating a), b), and c), wherein the amount of time $T_w$ is greater than or equal to zero and less than a timeout for connectivity failure between the first and second nodes.

7. The method of claim 1, wherein performing the check of connectivity between the first node and the second node includes sending one or more test packets from the first node to the second node using a transport address from the list of predicted transport addresses.

8. The method of claim 7 wherein delaying port prediction for communication between the first node and the third node includes delaying port prediction for communication between the first node and the third node until after a first of the one or more test packets has been sent.

9. A node, comprising:
    a processor;
    a memory;
    a network interface; and
    instructions embodied in the memory and configured for execution on the processor, the
    instructions comprising: a set of instructions that, when executed, cause the node to:
    i) receive a provisional response to a connection request message sent to a second node, wherein the connection request message contains a list of predicted transport addresses;

ii) perform a check of connectivity between the node and the second node using the list of predicted transport addresses; and iii) delay port prediction for communication between the node and a third node until after the check of connectivity between the node and the second node has begun.

10. The node of claim 9, wherein the instructions further comprise a set of instructions that, when executed, cause the node to:

iv) after iii), perform a port prediction for communication between the node and a third node, wherein the node constructs a list of predicted transport addresses on a first symmetric NAT;

v) send a connection request message containing the list of predicted transport addresses from the node to a third node;

vi) perform a check of connectivity between the node and the third node using the predicted transport addresses.

11. The node of claim 10, wherein the instructions further comprise a set of instructions that, when executed, cause the node to:

vii) delay port prediction for communication between the node and a fourth node until after the check of connectivity between the node and the third node.

12. The node of claim 9 wherein the node is configured to perform the check of connectivity between the node and the second node by sending Session Traversal Utility for NAT (STUN) packets from the second node to one or more transport addresses in the list of predicted transport addresses in the connection request message.

13. The node of claim 12 wherein the node is configured to perform the check of connectivity by sending a STUN packet response from the node to the second node, wherein the STUN packet response includes a transport address of an external port on the first symmetric NAT through which one of the STUN packets sent from the second node reached the node.

14. The node of claim 9, wherein the instructions further comprise a set of instructions that, when executed, cause the node to wait for a period of time Tw before receiving the provisional response in response to a message from the second node indicating that the second node is queued for connection to another node;

cancel the communication session between the node and the second node; and repeat i), ii), and iii), wherein the amount of time Tw is greater than or equal to zero and less than a timeout for connectivity failure between the node and the second node.

15. The node of claim 9, wherein the node is configured to perform the check of connectivity between the node and the second node sending one or more test packets from the node to the second node using a transport address from the list of predicted transport addresses.

16. The node of claim 15, wherein the node is configured to delay port prediction for communication between the node and the third node by delaying port prediction for communication between the node and the third node until after a first of the one or more test packets has been sent.

* * * * *